United States Patent [19]

Baker

[11] 4,342,791

[45] Aug. 3, 1982

[54] METHOD OF PURIFYING ISO-α-ACIDS

[75] Inventor: Charles D. Baker, Uttoxeter, England

[73] Assignee: Brewing Patents Limited, Great Britain

[21] Appl. No.: 152,150

[22] Filed: May 21, 1980

[30] Foreign Application Priority Data

May 24, 1979 [GB] United Kingdom ................. 7918074

[51] Int. Cl.³ .............................................. C12C 3/00
[52] U.S. Cl. .................................. 426/600; 426/651; 426/16
[58] Field of Search ................. 426/600, 592, 651, 16; 568/377

[56] References Cited

U.S. PATENT DOCUMENTS

| | | | |
|---|---|---|---|
| 2,816,032 | 12/1957 | Meyer | 426/600 X |
| 3,451,821 | 6/1969 | Todd | 426/592 X |
| 3,532,504 | 10/1970 | Flesch | 426/600 X |
| 3,751,266 | 8/1973 | Kuroiwa | 568/377 X |
| 3,787,499 | 1/1974 | Grant | 426/600 X |
| 3,949,092 | 4/1976 | Mitchell | 426/600 X |
| 4,212,895 | 7/1980 | Laws | 426/16 |

*Primary Examiner*—Norman Yudkoff
*Attorney, Agent, or Firm*—Wenderoth, Lind & Ponack

[57] ABSTRACT

A method of purifying aqueous solutions of iso-α-acids by removing β-acids therefrom comprises first bringing the solution to an iso-α-acid concentration of 0.5% to 10% $^w/w$, particularly 0.5% to 5% $^w/w$, then reducing the pH to a value in the range 7 to 10, preferably 8 to 9, so as to form an easily filtered precipitate of β-acids. Preferably pH reduction is effected by bubbling carbon dioxide through the solution. The separated iso-α-acid solution may be concentrated to an extent that a phase separation takes place into two aqueous phases one of which has a higher iso-α-acid concentration than the other. The recovered iso-α-acid solution is suitable for direct addition to beer without haze formation.

9 Claims, No Drawings

METHOD OF PURIFYING ISO-α-ACIDS

METHOD OF PURIFYING ISO-ALPHA-ACIDS

This invention relates to a method of purifying aqueous solutions of iso-α-acids, particularly by removing β-acids therefrom. Iso-α-acids are the principal bittering components in beer, and it has for some years been commercially attractive to provide some or all of the bitterness in the beer by adding the iso-α-acids to the finished beer, rather than by incorporating hops during the brewing process. It is well known that α-acids may be extracted from hops, typically using carbon dioxide or organic solvents, and that the α-acids may be isomerized by boiling them in aqueous alkaline solution to give the desired iso-α-acids.

Because of the risk that organic solvent extraction of hops may leave traces of toxic organic solvents in the product, which is destined for human consumption, it is preferred to extract hops using liquid carbon dioxide by the process of our copending British Patent Applications 42613/76 and 1944/77 (corresponding to German DOS P 27 45 829 and P 28 01 843 respectively). The extract contains α-acids, β-acids, hop oil, and possibly some fats and waxes, but little else, and is suitable for direct isomerization without intermediate purification. The hop oil and any fats and waxes are readily removed during the isomerization process, as described in our copending British Patent Application 23220/78, to give an aqueous alkaline solution containing iso-α-acids and β-acids but little else.

β-Acids are not themselves bitter, though they can be made so by oxidation. When a solution of iso-α-acids and β-acids is added to beer, the β-acids precipitate and carry down with them a substantial proportion of the iso-α-acids. Thus, β-acids render the beer cloudy, thus requiring a final filtration step, and reduce iso-α-acid utilisation, and are not desired.

German DOS P 27 45 829 describes a process for removing β-acids from an aqueous solution of iso-α-acids by adjusting the concentration to no more than 5 gms. per liter of iso-α-acids and adjusting the pH of the solution to from 2 to 5, so as to precipitate the β-acids. This process is not very reliable, and it involves a very great dilution of the iso-α-acids to avoid precipitating them along with the β-acids. This is expensive, in terms of equipment to handle the large volumes involved, and of power to concentrate the resulting purified iso-α-acid solution to an acceptable level. There is a need for a method of removing β-acids which is more reliable and does not involve such extreme dilution of the solution.

The present invention provides a method of treating a starting aqueous solution containing iso-α-acids and β-acids derived from hops at a pH greater than 9, which method comprises first, if the starting solution is too concentrated, bringing it to an iso-α-acid concentration of from 0.5% to 10% w/w, then reducing the pH to a value in the range 7 to 10, the iso-α-acid concentration and the pH being chosen, having regard to the molar ratio of iso-α-acid to other anions in the solution (the salt: iso-α-acid molar ratio), so as to form a precipitate of β-acids which may be readily filtered to give a clear filtrate, and separating an aqueous solution of the iso-α-acids from the precipitated β-acids.

The method of the invention is applicable in principle to iso-α-acid solutions from any source, for example carbon dioxide extracts or organic solvent hop extracts.

Typically, the product resulting from α-acid isomerization is an aqueous alkaline solution at a pH of from 9 to 11 containing 5 to 50% by weight of iso-α-acids in the form of their alkali metal salts, and containing as additional electrolyte at least that amount of base necessary to provide the indicated pH. One possible isomerization process, which forms the subject of British Patent Application 23220/78, typically provides a product aqueous solution at a pH of 9 to 11 containing from 20 to 50% by weight of iso-α-acids and a salt concentration at least as great, mole for mole, as that of the iso-α-acids; preferably, the salt is potassium carbonate, which functions both to provide the desired isomerization pH and the desired electrolyte concentration.

This iso-α-acid solution is, if initially at higher concentration, diluted to a starting concentration in the range 0.5% to 10% by weight. This dilution is necessary because iso-α-acids are not very soluble in water below pH 9, and their solubility is dependent on pH and on the salt concentration of the solution. This at a pH of 8.7 to 9.0, when the salt/iso-α-acids molar ratio is 2.0, the iso-α-acid solubility is about 6%; and when the salt/iso-α-acid molar ratio is 1.0, the iso-α-acid solubility is about 13%. In practice, however, the iso-α-acids tend to come out of solution with the β-acids at much lower concentrations. Moreover, while β-acids precipitate in a form which is readily filtered to give a clear filtrate, β-acids contaminated with iso-α-acids precipitate in the form of a sticky solid which is difficult to handle or filter.

It is desirable on general economic grounds not to dilute the iso-α-acid solution more than is necessary to avoid precipitating iso-α-acids along with the β-acids. The optimum dilution in any particular circumstances needs to be determined by experiment. As a guide, a 2% w/w iso-α-acid concentration is often appropriate at a salt:iso-α-acid molar ratio of 2.0; and a 3% iso-α-acid concentration at a salt/iso-α-acid molar ratio of 1.0. At these concentrations the precipitates are easy to filter and contain up to 99% of β-acids. Contamination of the resulting isomerized extract with residual β-acids is negligible.

When the salt concentration is lower the iso-α-acid concentration may be higher. At a salt/iso-α-acid molar ratio of 0.75, it is possible to operate at a 7% iso-α-acid concentration; and an even higher iso-α-acid concentration is doubtless possible at a salt/iso-α-acid molar ratio of 0.5; but it is difficult to isomerise α-acids at a salt/α-acid molar ratio below about 1.0. The iso-α-acid concentration is therefore preferably in the range 0.5% to 5.0%.

pH adjustment using conventional non-toxic acids such as phoshoric acid or hydrochloric acid, may be employed. However, it is preferred to effect pH adjustment by bubbling carbon dioxide into the aqueous composition until the desired pH is achieved. The use of carbon dioxide for this purpose has several advantages; the pH is easily controlled; no further extraneous chemicals are involved; the precipitate is more quickly filtered to give a filtrate of better clarity than when using phosphoric or hydrochloric acid; if the filtrate is subsequently concentrated by evaporation, the bicarbonate decomposes, the resulting carbon dioxide vapourises and raises the pH, typically to 9.0 to 10.5, which is a better pH for storing and using iso-α-acids.

If the pH at precipitation is to low, then the β-acids are contaminated with iso-α-acids and other materials. This reduces the yield of desired iso-α-acid in the filtrate. Furthermore the β-acid precipitate is a valuable product which can be oxidised to provide additional bittering components for beer, so a contaminated precipitate is not desired. If the pH at precipitation is too high, then recovery of β-acids in the precipitate may be incomplete. A preferred pH range, taking these functions into account, is 8.0–9.0.

The pH chosen for the method needs to be correlated with the iso-α-acid concentration and the salt concentration so as to precipitate as large a proportion as possible of the β-acids without significant contamination by iso-α-acids. A pH in the range 8.4 to 8.6 is particularly preferred, on the ground that β-acid precipitates having very low levels of contamination with iso-α-acids can be obtained. A pH of 8.5 is regarded as optimal for the precipitation of β-acids from 2–3% iso-β-acid solutions. The precipitate may readily be separated from the filtrate by conventional procedures such as centrifuging following by decanting, or more usually by filtration.

The temperature at which the method of this invention is performed is not critical. Elevated or lowered temperatures may be used, but we generally operate at ambient temperatures.

The resulting purified iso-α-acid solution may be added to bright beer without haze formation. However, the solution is comparatively dilute, and may advantageously be concentrated, particularly if it is to be transported prior to use. The concentration of the purified aqueous composition may advantageously be raised, for example by evaporation, to a value in the range 5 to 60%, typically 10 to 30% by weight. During the course of such concentration a phase separation into two aqueous phases, hereinafter designated as an "oily" and an "aqueous" phase, takes place, similar to that reported in connection with the isomerization process of our co-pending British Application 23220/78. The iso-α-acid concentration at which this phase separation occurs depends on the salt concentration of the solution, being higher at lower concentrations, and is typically in the range 5% to 40% by weight.

This phase separation appears to be a form of salting out, though the two phases are unusual. The oily phase is an alkaline aqueous solution of iso-α-acids, or rather a salt or salts thereof, of relatively high concentration typically in the range 15% to 60% by weight, the precise figure in any case depending on the overall composition of the reaction mixture and particularly on the concentration of iso-α-acids and salts and their ratio in the mixture as a whole.

The aqueous phase is a more dilute alkaline aqueous solution of iso-α-acids salt or salts, typically having a concentration of from 0.2% to 3.5% by weight, again depending on the particular composition of the reaction mixture.

The terms "oily phase" and "aqueous phase" thus both represent aqueous solutions but of differing compositions. The oily phase has the usual appearance of an oil, the viscosity of which depends on the concentrations of iso-α-acids and other salts in the reaction mixture. The aqueous phase has the visual appearance expected of an alkaline salt solution.

This phase separation, and the resultant purification, is applicable to iso-α-acid solutions from any source, and can be made to occur by concentration and/or addition of salt to the solution such that the conditions for two-phase formation are exceeded.

This phase separation is valuable because residual impurities, particularly humulinic acids and oxidation products of hop resins, are mostly retained in the aqueous phase, leaving an oily phase of enhanced iso-α-acid concentration and purity which may be added direct to bright beer without haze formation. The aqueous phase, which contains small amounts of iso-α-acids, may be recycled or otherwise treated to recover them.

The following Examples illustrate the invention.

EXAMPLE 1

PRECIPITATION OF β-ACIDS AND EVAPORATION OF β-ACIDS-FREE EXTRACT 3.0 kg of a solution containing 29.6% iso-α-acids and 20.4% β-acids were diluted to 39 liters with distilled water. The pH was lowered to 8.5 by bubbling in $CO_2$, stirring was continued for a further 1 hr. to coagulate the precipitated β-acids, and the slurry was filtered through medium grade porosity sheets (0.13 sq. m.). The filtrate was concentrated under vacuum in a cyclone evaporator at a maximum temperature of 33° C. to give 9.1 kg of a clear, orange extract containing 9.3% $^w$/w iso-α-acids (95.5% yield) and 0.43% β-acids.

A portion of the β-acids-free filtrate (325 ml.) was concentrated to 33% iso-α-acids under vacuum in a rotary evaporator, and the two phases allowed to separate. The oil phase 14.8 g containing 52.4% $^w$/w iso-α-acids (96.8% yield) when diluted to 1% iso-α-acids gave a bright, lemon yellow solution, pH 9.65 whilst the aqueous phase 10 g containing 2.6% $^2$/w iso-α-acids (3.2% yield) gave a hazy brown solution, pH 10.2 when diluted to 1% iso-α-acids. The lemon yellow solution was demonstrated by ion-exchange chromatography to be of excellent purity.

EXAMPLE 2

Various solutions of iso-α-acids and β-acids, containing various concentrations of potassium carbonate as base were placed in test tubes and subjected to bubbling carbon dioxide until a pH of 8.4 to 8.6 was reached. The results of experiments are set out in Tables 1, 2 and 3.

Analysis showed that white or cream precipitates consisted essentially of β-acids, while sticky yellow material was quite heavily contaminated with iso-α-acids.

EXAMPLE 3

β-Acid precipitation was effected under various conditions, which are set out, together with the results obtained, in Table 4 below. It will be noted that, where carbon dioxide bubbling was continued to a final pH of 7.4, the precipitated β-acids were heavily contaminated. The sticky yellow solid obtained in some experiments was not readily filterable. The conclusion may be drawn that, at a base/iso-β-acid molar ratio of 2.0, the iso-α-acid concentration should not be more than about 2.0% $^w$/v; and that at a base/iso-α-acid molar ratio of 1.0, the iso-α-acid concentration should be not more than 3.0% $^w$/v.

EXAMPLE 4

Isomerisation of Hexane Extract 13.5 g of a commercial hexane hop extract containing 40% α-acids and 27% β-acids was isomerized with potassium carbonate (4.14 g in 50 ml water) for 1¼ hr. After cooling a further 2.1 g of potassium carbonate were added with stirring to dissolve.

The relatively mobile, dark green oil phase (15 g) contained 31.4% iso-α-acids (87% yield) and the aqueous phase (40 ml) contained 0.97% iso-α-acids (7.2% yield). A wax layer (1.3 g) solidified on top of the aqueous layer which also contained some insoluble material.

5 g of the oil phase was diluted to 3% iso-α-acids with distilled water and filtered to remove precipitated material. β-acids were removed by precipitation at pH 8.5 and the filtrate concentrated to 30% iso-α-acids by the method described in Example 1. The second oil phase (1.69 g) contained 45.1% iso-α-acids (42.2% overall yield from hexane extract) and was shown by ion-exchange chromatography to be of excellent purity.

EXAMPLE 5

Isomerisation of $CO_2$ Extract Followed by Removal of β-acids 2.69 kg of Northdown hop extract containing 42.8% α-acids and 27.5% β-acids were added to 0.88 kg potassium carbonate in sufficient water to give a final volume of 23.2 liters. The mixture was boiled under partial reflux for 65 min, the hop oils (60 ml) being recovered in the distillate (1.6 liters).

The isomerised extract was separated from the upper layer of hop waxes (0.52 liters), cooled to 15° C. and diluted to 56 liters with distilled water. The pH was lowered to 8.4 with $CO_2$ and stirring was continued for a further 1 hr to coagulate the precipitated β-acids.

The β-acids were removed by filtering through a medium grade porosity sheet filter (0.2 sq m) under a pressure of 15 p.s.i., and washed with 2 liters of 1.65% potassium bicarbonate solution.

The combined filtrate and washings (55 liters) contained 19.9 g/liter iso-α-acids (95.1% yield), 0.29 g/liter α-acids, 0.81 g/liter humulinic acids and 0.32 g/liter β-acids.

EXAMPLE 6

Isomerisation of methylene chloride extract and removal of β-acids 13.3 g of a commercial methylene chloride extract of hops containing 30% α-acids were boiled under reflux under nitrogen with 3.05 g potassium carbonate in 200 ml water for 1 hr. The isomerised extract was separated from the upper layer of waxes, cooled to 16° C. and the pH lowered to 8.5 with $CO_2$. Stirring was continued for 1¼ hr to coagulate the β-acids.

The β-acids were removed by filtration, washed with 10 ml of 1.65% potassium bicarbonate solution, and the combined filtrate and washings concentrated under vacuum to 28.6 g (14% by weight original α-acids). The product was allowed to separate into two phases.

The oil phase (7.4 g) was diluted to 10.2 g with distilled water to give a mobile, clear brown liquid containing 19.0% by weight of iso-α-acids (50.1% yield), 0.64% β-acids and 2.3% α-acids. Further dilution to 1% iso-α-acids gave a clear, amber coloured solution, pH 9.2.

The aqueous phase (20.7 g) contained 1.25% by wt iso-α-acids (6.5% yield). Dilution to 1% iso-α-acids gave a cloudy solution, pH 9.9.

TABLE 1

Effect of extract concentration on β-acids precipitation of isomerized $CO_2$ hop extract (All precipitations carried out in test tubes by purging with $CO_2$)

| iso-α-acids (% w/v) | Total Base/iso-α-acids ratio | Comments |
| --- | --- | --- |
| 2.75 | 1.0 | White precipitate |
| 3.5 | 1.0 | White precipitate* |
| 4.0 | 1.0 | White precipitate* |
| 4.5 | 1.0 | White precipitate, slight yellow material |
| 4.75 | 1.0 | Yellow sticky material |
| 5.0 | 1.0 | Yellow sticky material |
| 5.5 | 1.0 | Yellow sticky material |

*A yellow, sticky material separated out on standing for 1 hr.

TABLE 2

Effect of extract concentration on β-acids precipitation of isomerized $CO_2$ hop extract (All precipitations carried out in test tubes by purging with $CO_2$)

| iso-α-acids (% w/v) | Total Base/iso-α-acids ratio | Comments |
| --- | --- | --- |
| 2.5 | 2.0 | Cream precipitate |
| 3.0 | 2.0 | Cream precipitate* |
| 3.5 | 2.0 | Slight yellow sticky material |
| 4.0 | 2.0 | Yellow sticky material |
| 4.5 | 2.0 | Yellow sticky material |

*Yellow sticky material separated on standing for 1 hr.

TABLE 3

Effect of carbonate concentration on β-acids precipitation of isomerized $CO_2$ hop extract (All precipitations carried out in test tubes by purging with $CO_2$)

| iso-α-acids (% w/v) | $K_2CO_3$ added (% w/v) | Total Base/iso-α-acids ratio | Comments |
| --- | --- | --- | --- |
| 2.1 | NIL | 2.2 | Cream Precipitate |
| 2.1 | 1 | 3.4 | Cream Precipitate |
| 2.1 | 2 | 4.7 | Slight yellow sticky material |
| 2.1 | 3 | 5.9 | Yellow sticky material |
| 2.1 | 4 | 7.2 | Heavy yellow sticky material |

TABLE 4

Precipitation of β-acids from isomerized $CO_2$ hop extract (All precipitations carried out on 50 ml with stirring)

| iso-α-acids (% w/v) | Base/iso-α-acids | Acid | Final pH | β-acids (% w/w) | Precipitate iso-α-acids (% w/w) | Filtrate β-acids iso-α acids (%) |
| --- | --- | --- | --- | --- | --- | --- |
| 1.9 | 2.0 | $CO_2$ | 8.4 | 91 | <0.4 | 5.3 |
| 1.9 | 2.0 | $CO_2$ | 7.4 | 64 | 0.5 | 2.8 |
| 2.1 | 2.2 | $H_3PO_4$ | 8.5 | 96 | <0.4 | 5.9 |
| 2.5 | 2.0 | $CO_2$ | 8.5 | Yellow sticky solid | | |
| 3.0 | 1.0 | $CO_2$ | 8.5 | 99 | <0.4 | 6.6 |
| 3.0 | 2.0 | $CO_2$ | 8.5 | Yellow sticky solid | | |
| 4.0 | 1.0 | $CO_2$ | 8.4 | Yellow sticky solid | | |

I claim:

1. A method of treating a starting aqueous solution containing iso-α-acids and β-acids derived from hops at a pH greater than 9, which method comprises first, if the starting solution is too concentrated, bringing it to an iso-α-acid concentration of from 0.5% to 10% w/w, then reducing the pH to a value in the range 7 to 10, the iso-α-acid concentration and the pH being chosen, having regard to the molar ratio of iso-α-acid to other anions in the solution, so as to form a precipitate of β-acids which may be readily filtered to give a clear filtrate, separating an aqueous solution of the iso-α-acids from the precipitated β-acids, and concentrating the separated aqueous solution to an iso-α-acid concentration in the range 5% to 60% by weight to the extent that a phase separation takes place into two aqueous phases of which one contains a higher concentration of iso-α-acids than the other.

2. The method as claimed in claim 1, including the further step of recovering the aqueous phase containing a higher concentration of iso-α-acids.

3. The method as claimed in claim 2, including the further step of adding the recovered aqueous phase containing a higher concentrartion of iso-α-acids to beer.

4. A method of treating a starting aqueous solution containing iso-α-acids and β-acids derived from hops at a pH greater than 9, which method comprises first, if the starting solution is too concentrated, bringing it to an iso-α-acid concentration of from 0.5% to 10% w/w, then reducing the pH to a value in the range 7 to 10 by bubbling carbon dioxide into the solution, the iso-α-acid concentration and the pH being chosen, having regard to the molar ratio of iso-α-acid to other anions in the solution, so as to form a precipitate of β-acids which may be readily filtered to give a clear filtrate, and separating an aqueous solution of the iso-α-acids from the precipitated β-acids.

5. The method as claimed in any one of claims 4 or 1, wherein the starting solution is brought to an iso-α-acid concentration of from 0.5% to 5% w/w.

6. The method as claimed in any one of claims 4 or 1, wherein the pH is reduced to a value in the range 8 to 9.

7. The method as claimed in claim 6, wherein the pH is reduced to a value in the range 8.4 to 8.6.

8. The method as claimed in claims 4 or 1, wherein the separated aqueous solution of iso-α-acid is concentrated to an iso-α-acid concentration in the range 5% to 60% by weight.

9. The method as claimed in claim 4 or 1, including the further step of adding the separated aqueous solution of iso-α-acids to beer.

* * * * *